US011920724B2

United States Patent
Cao et al.

(10) Patent No.: US 11,920,724 B2
(45) Date of Patent: Mar. 5, 2024

(54) ELECTRONIC APPARATUS

(71) Applicant: BOE TECHNOLOGY GROUP CO., LTD., Beijing (CN)

(72) Inventors: Lei Cao, Beijing (CN); Junmin Sun, Beijing (CN); Jinggang Wei, Beijing (CN); Wenbin Wang, Beijing (CN); Yunpeng Wu, Beijing (CN); Yan Ren, Beijing (CN); Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 168 days.

(21) Appl. No.: 17/521,978

(22) Filed: Nov. 9, 2021

(65) Prior Publication Data
US 2022/0154873 A1 May 19, 2022

(30) Foreign Application Priority Data

Nov. 17, 2020 (CN) .......................... 202022666786.4

(51) Int. Cl.
*F16M 11/04* (2006.01)
*F16M 11/22* (2006.01)
*H04R 1/02* (2006.01)
*H05K 5/00* (2006.01)

(52) U.S. Cl.
CPC ............. *F16M 11/04* (2013.01); *F16M 11/22* (2013.01); *H04R 1/028* (2013.01); *H05K 5/0017* (2013.01); *H04R 2400/11* (2013.01); *H04R 2499/15* (2013.01)

(58) Field of Classification Search
CPC ..................................................... H05K 5/0017
See application file for complete search history.

(56) References Cited

U.S. PATENT DOCUMENTS

| 6,967,632 | B1 * | 11/2005 | Minami | ................ | F16M 11/10 |
| | | | | | 403/80 |
| 2015/0363017 | A1 * | 12/2015 | Sitbon | ....................... | G06F 1/18 |
| | | | | | 361/679.21 |
| 2018/0080598 | A1 * | 3/2018 | Ligtenberg | ............. | F16M 11/18 |

FOREIGN PATENT DOCUMENTS

| CN | 201153297 Y | 11/2008 |
| CN | 102984485 A | 3/2013 |
| CN | 204336309 U | 5/2015 |
| CN | 105357458 A | 2/2016 |
| CN | 106484033 A | 3/2017 |
| CN | 106488671 A | 3/2017 |
| CN | 211574682 U | 9/2020 |

* cited by examiner

*Primary Examiner* — Priyank J Shah
(74) *Attorney, Agent, or Firm* — HOUTTEMAN LAW LLC

(57) ABSTRACT

Disclosed is an electronic apparatus, including: a display device, a base, a detachable connector, an auxiliary display module, and a placement portion for placing the auxiliary display module, the display device being disposed on the base through the detachable connector.

18 Claims, 9 Drawing Sheets

ELECTRONIC APPARATUS

CROSS-REFERENCE TO RELATED APPLICATION

The present application claims priority from Chinese patent application No. 202022666786.4 filed with China National Intellectual Property Administration (CNIPA) on Nov. 17, 2020, the disclosure of which is incorporated herein by reference.

TECHNICAL FIELD

The present disclosure relates to the field of display technology, and particularly relates to an electronic apparatus.

BACKGROUND

Large-sized display products, which generally include a display module, a bezel assembly, and a base, are increasingly used. As a result, how to facilitate product assembly and maintenance has become an urgent problem to be solved.

SUMMARY

To solve at least one of the problems in the related art, the present disclosure provides an electronic apparatus.

The present disclosure provides an electronic device, including: a display device, a base, a detachable connector, an auxiliary display module, and a placement portion for placing the auxiliary display module, the display device being disposed on the base through the detachable connector.

In some embodiments, the display device includes:

a main display module;

a bezel assembly disposed on the base through the detachable connector and including a bezel assembly and a first backplane, the bezel including a plurality of sidewalls surrounding the main display module and connected to the first backplane, and an accommodation space defined by the bezel and the first backplane, in which the main display module is located; wherein a surface of at least one of the sidewalls facing the main display module is provided with a protrusion; and a first adaptor including: a first wall, a second wall, a first clamping portion and a second clamping portion, wherein each of the second wall, the first clamping portion and the second clamping portion is connected to the first wall, the first wall is connected to the first backplane, the second wall is disposed opposite to the sidewalls, and the first clamping portion and the second clamping portion are configured to clamp the protrusion.

In some embodiments, the first clamping portion is located on a side of the protrusion away from the first backplane, and the second clamping portion is located on a side of the protrusion close to the first backplane;

the first clamping portion includes: a first upright plate and a first inclined plate, two ends of the first upright plate are respectively connected to the first wall and the first inclined plate, and the first inclined plate is inclined to the first upright plate; and from one end of the first inclined plate close to the first upright plate to the other end away from the first upright plate, the first inclined plate gradually gets away from the first backplane;

the second clamping portion includes: a second upright plate and a second inclined plate, two ends of the second upright plate are respectively connected to the first wall and the second inclined plate, and the second inclined plate is inclined to the second upright plate; and from one end of the second inclined plate close to the second upright plate to the other end away from the second upright plate, the second inclined plate gradually gets closer to the first backplane; and the first upright plate and the second upright plate are configured to clamp the protrusion.

In some embodiments, an orthographic projection of the first clamping portion on the first backplane does not overlap with an orthographic projection of the second clamping portion on the first backplane.

In some embodiments, the first wall is bonded to the first backplane.

In some embodiments, the bezel assembly further includes: a second backplane located between the main display module and the first backplane;

a side of the second backplane facing the first backplane is provided with a mounting pipe fixed on the second backplane; and the detachable connector includes a mounting rod and a first mounting platform, the first mounting platform is fixed on the base, and the mounting rod is vertically arranged on the first mounting platform and configured to extend into and be fixed within the mounting pipe.

In some embodiments, the electronic apparatus further includes a speaker assembly located between the base and the display device, and connected to the detachable connector.

In some embodiments, the speaker assembly includes a speaker housing having through holes in both a bottom wall and a top wall thereof to allow the mounting rod to pass therethrough.

In some embodiments, the detachable connector further includes a second mounting platform abutting a top wall of the speaker housing, and the speaker housing has a height less than a distance between the first mounting platform and the second mounting platform so that there is a non-zero spacing between the speaker housing and the base.

In some embodiments, a hollowed-out portion is provided on the speaker housing, and the placement portion is disposed in the speaker housing and opposite to the hollowed-out portion, so that the auxiliary display module is exposed from the hollowed-out portion.

In some embodiments, the placement portion includes: a first support portion and a second support portion arranged in sequence along a direction away from the bottom wall of the speaker housing, the first support portion has a first support surface, the second support portion has a second support surface, and the first support surface and the second support surface are both inclined to the bottom wall of the speaker housing, and an angle between a plane where the first support surface is located and the bottom wall of the speaker housing is greater than an angle between a plane where the second support surface is located and the bottom wall of the speaker housing, so that one part of the auxiliary display module is supported on the first support surface, while the other part forms a non-zero angle with the second support surface.

In some embodiments, the first support portion is magnetic, and the auxiliary display module is attached to the first support portion.

In some embodiments, the placement portion is disposed on the base.

In some embodiments, the auxiliary display module includes a touch structure configured to detect occurrence of touch.

In some embodiments, the base includes a top plate and multiple pairs of supports, the two supports of the same pair being connected to opposite ends of the top plate, respectively;

wherein each support includes a first support strip and a second support strip, top ends of the first support strip and the second support strip are both connected to the top plate, and extending directions of the first support strip and the second support strip are crossed with each other.

In some embodiments, the base further includes a first connector and a second connector, bottom ends of the two first support strips of the same pair of supports are connected to two ends of the first connector, respectively, and bottom ends of the two second support strips of the same pair of supports are connected to two ends of the second connector, respectively.

In some embodiments, the plurality of sidewalls of the bezel include: a first sidewall and a plurality of second sidewalls, the first sidewall is disposed between the main display module and the base and provided with the protrusion, and the first clamping portion and the second clamping portion of the first adaptor is configured to clamp the protrusion on the first sidewall; and the display device further includes a second adaptor including: a first fixing portion and a second fixing portion connected to the first fixing portion, the first fixing portion being connected to the first backplane, and the second fixing portion being connected to the second sidewall.

In some embodiments, the first fixing portion is bonded to the first backplane.

In some embodiments, the bezel further includes a shield portion connected to each of the sidewalls in one-to-one correspondence, the main display module is located between the shield portion and the first backplane, and the shield portion is configured to shield an edge region of the main display module.

BRIEF DESCRIPTION OF THE DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure. In the drawings.

DETAILED DESCRIPTION OF THE EMBODIMENTS

To make the objects, technical solutions and advantages of the disclosure clearer, the technical solutions in the embodiments of the disclosure will now be described clearly and completely with reference to the accompanying drawings of the embodiments of the disclosure. Obviously, the described embodiments are only a part, not all, of the embodiments of the disclosure. Based on the described embodiments of the disclosure, all the other embodiments obtained by those ordinary skilled in the art without any creative labor fall into the protection scope of the disclosure.

The terminology used herein to describe embodiments of the disclosure is not intended to limit and/or define the scope of the disclosure. For example, unless otherwise defined, technical or scientific terms used in the present disclosure are intended to have general meanings as understood by those of ordinary skill in the art. It should be understood that the words "first", "second" and similar terms used in the present disclosure do not denote any order, quantity, or importance, but are used merely for distinguishing different components. The singular forms "a," "an," or "the" and similar referents do not denote a limitation of quantity, but rather denote the presence of at least one, unless the context clearly dictates otherwise. Words like "comprising" or "comprises" means that the element or item preceding the word includes elements or items that appear after the word or equivalents thereof, but does not exclude other elements or items. Words like "upper", "lower", "left", "right" are merely used to indicate a relative positional relationship, and when an absolute position of the described object is changed, the relative positional relationship may also be changed accordingly.

In the following description, when an element or layer is referred to as being "on" or "connected to" another element or layer, it can be directly on, connected to, or intervening elements or layers may be present. However, when an element or layer is referred to as being "directly on" or "directly connected to" another element or layer, there are no intervening elements or layers present. The term "and/or" includes any and all combinations of one or more of the listed items.

Figure 1:
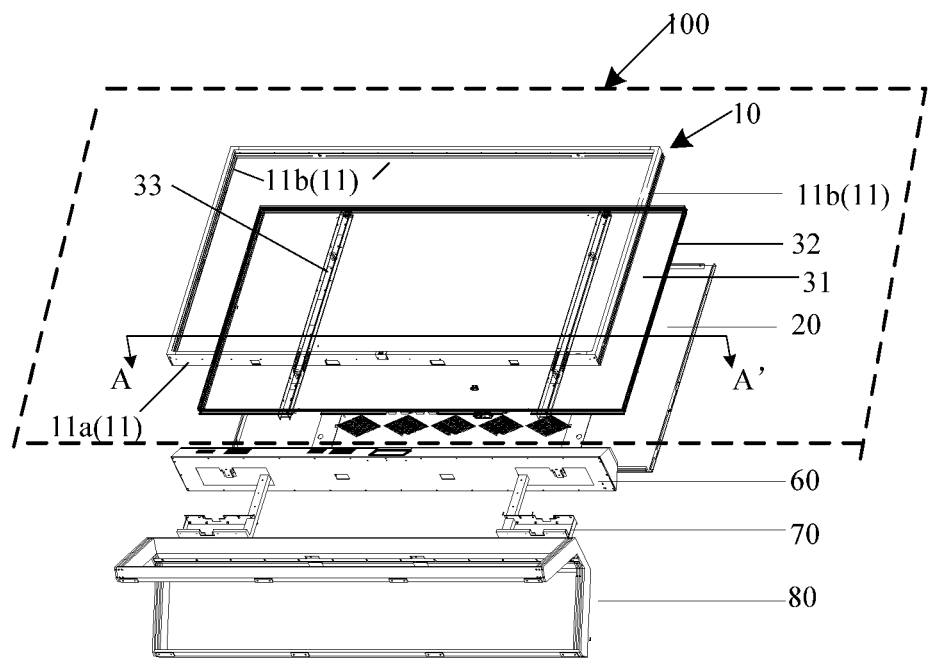
FIG. 1 is an exploded schematic view of a display device provided in some embodiments of the present disclosure.

An embodiment of the present disclosure provides an electronic apparatus. FIG. 1 is an exploded schematic view of an electronic apparatus provided in some embodiments of the present disclosure. As shown in FIG. 1, the electronic apparatus includes: a display device 100, a detachable connector 70, a base 80, an auxiliary display module, and a placement portion for placing the auxiliary display module. The display device 100 may include a main display module DM1. The auxiliary display module and the placement portion are not shown in FIG. 1. The placement portion may be disposed on the base 80, or may be disposed on another structure. Here, "module" refers to a modularized component. Each modularized component may be assembled separately first, and then assembled into the complete machine according to a certain order.

The auxiliary display module has a size smaller than the main display module DM1, and plays a role in auxiliary display. The auxiliary display module and the display device may display at the same time to improve the viewing experience of a user. Further, the display device 100 is disposed on the base 80 via the detachable connector 70, so that the assembly of the entire electronic apparatus can be easily assembled.

Figure 2:
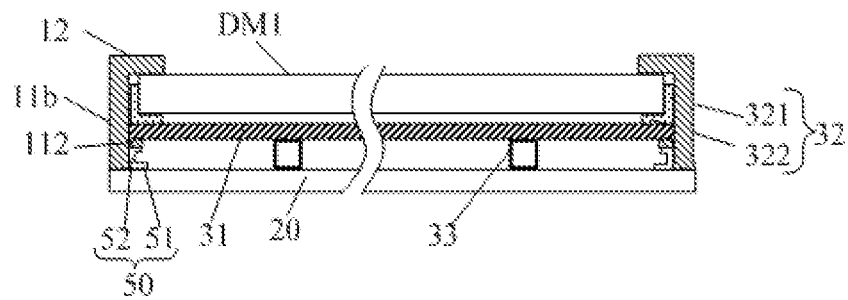
FIG. 2 is a sectional view of the assembled bezel assembly and display module provided in some embodiments of the present disclosure.
Figure 3:
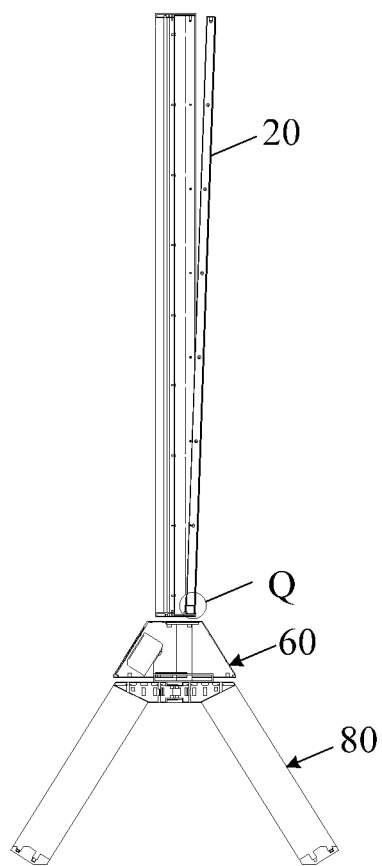
FIG. 3 is a side view of a display device provided in some embodiments of the present disclosure during assembly.
Figure 4:
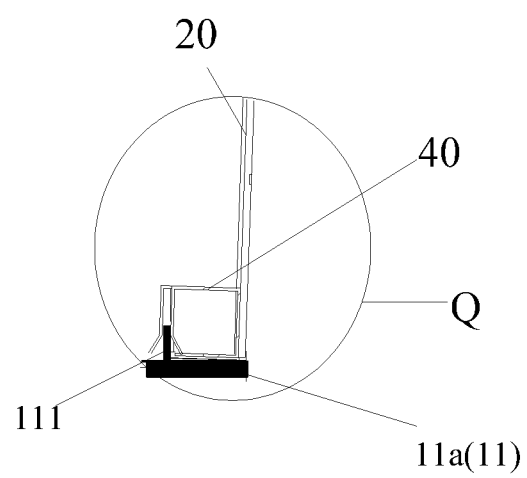
FIG. 4 is a partially enlarged view of the region Q in FIG. 3.
Figure 5:
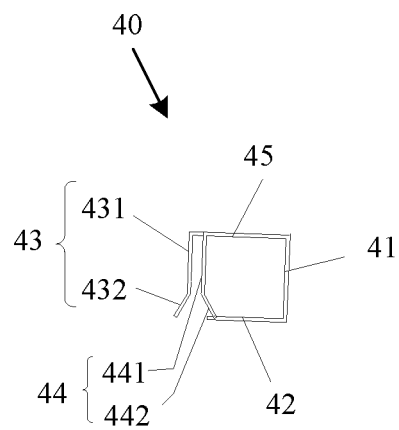
FIG. 5 is a side view of the first adaptor in FIG. 4.
Figure 6:
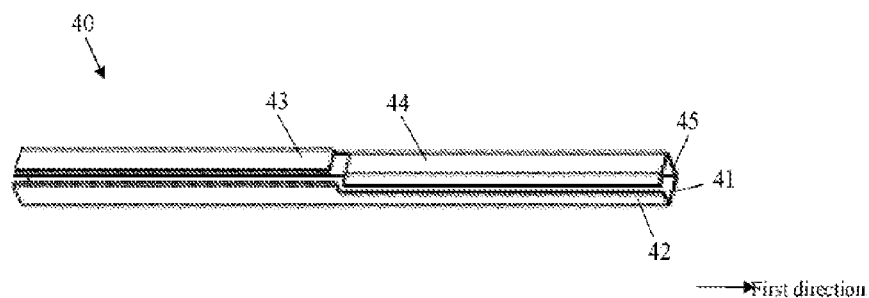
FIG. 6 is a perspective view of a first adaptor provided in some embodiments of the present disclosure.
Figure 7:
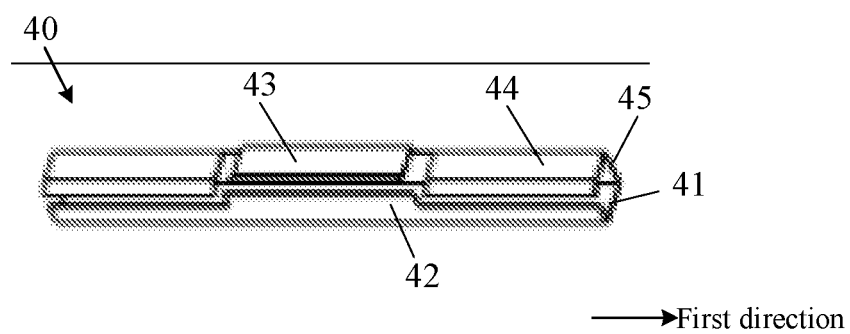
FIG. 7 is another perspective view of a first adaptor provided in some embodiments of the present disclosure.

FIG. 2 is a sectional view of the assembled bezel assembly and main display module taken along line A-A' of FIG. 1 provided in some embodiments of the present disclosure. FIG. 3 is a side view of an electronic apparatus provided in some embodiments of the present disclosure during assembly. FIG. 4 is a partially enlarged view of the region Q in FIG. 3. FIG. 5 is a side view of the first adaptor in FIG. 4. FIG. 6 is a perspective view of a first adaptor provided in some embodiments of the present disclosure. FIG. 7 is another perspective view of a first adaptor provided in some embodiments of the present disclosure.

As shown in FIGS. 1 to 7, the display device includes: a main display module DM1, a bezel assembly and a first adaptor 40. The main display module DM1 may be an OLED display module; or a liquid crystal display module. The bezel assembly includes: a bezel 10, and a first backplane 20 that may be an integrally formed plate-shaped structure, or may be formed by splicing a plurality of plate-shaped portions. The bezel 10 includes a plurality of sidewalls 11 surrounding the main display module DM1 and connected to the first backplane 20. An accommodation space for accommodating the main display module DM1 is defined between the sidewalls 11 and the first backplane 20, and the main display module DM1 is located in the accommodation space. A surface of at least one of the sidewalls 11 facing the main display module DM1 is provided with a protrusion 111.

The first adaptor 40 includes: a first wall 41, a second wall 42, a first clamping portion 43 and a second clamping portion 44. Each of the second wall 42, the first clamping portion 43 and the second clamping portion 44 is connected to the first wall 41, The first clamping portion 43 and the second clamping portion 44 may be directly connected to the first wall 41, or indirectly via another structure. The first wall 41 is connected to the first backplane 20, the second wall 42 is disposed opposite to the sidewalls 11 of the bezel 10, and the first clamping portion 43 and the second clamping portion 44 are configured to clamp the protrusion 111. The plurality of sidewalls 11 of the bezel 10 include: a first sidewall 11a and a plurality of second sidewalls 11b. When the display device is in an upright state, the first sidewall 11a is located below the main display module DM1. Optionally, a protrusion 111 is provided on the first sidewall 11a, and the first clamping portion 43 and the second clamping portion 44 of the first adaptor 40 are configured to clamp the protrusion 111 on the first sidewall 11a. For example, the first clamping portion 43 is located on a side of the protrusion 111 away from the first backplane 20, the second clamping portion 44 is located on a side of the protrusion 111 close to the first backplane 20, and the first clamping portion 43 and the second clamping portion 44 clamp the protrusion 111 therebetween. Here, "the second wall 42 being disposed opposite to the sidewalls 11 of the bezel 10" preferably means that "the second wall 42 is not connected to the sidewalls 11 of the bezel 10 via a fixing member", and with the clamping portions 43, 44 connected to the protrusion 111, the first adaptor 40 and the sidewalls 11 are kept relative fixed even if the second wall 42 is not connected to the sidewalls 11 of the bezel 10 via a fixing member, thereby simplifying the assembly.

Moreover, a structure such as a base is generally provided on a side of the first sidewall 11a away from the main display module DM1. If the second wall 42 of the first adaptor 40 is connected to the first sidewall 11a of the bezel 10 via a fastener such as a screw, the structure such as a base below the bezel assembly will hinder attachment or detachment of the screw with a screwdriver when the second wall of the first adaptor 40 is connected to or removed from the first sidewall 11a. In contrast, in the embodiments of the present disclosure, the first wall 41 of the first adaptor 40 is connected to the first backplane 20, the second wall 42 is disposed opposite to the sidewalls 11 of the bezel 10, and the first clamping portion 43 and the second clamping portion 44 are configured to clamp the protrusion 111 on the sidewalls 11 of the bezel 10, so that under the clamping action of the first clamping portion 43 and the second clamping portion 44, the first adaptor 40 and the sidewalls 11 of the bezel 10 can be kept stable, and no fastener such as a screw is required to connect the sidewalls 11 of the bezel 10 to the first adaptor 40, thereby facilitating disassembly, assembly and maintenance of the whole display device.

In some embodiments, the first adaptor 40 may further include a connection wall 45 substantially perpendicular to the first wall 41. Here, "substantially perpendicular" means an included angle between 80° and 100°. The first clamping portion 43 and the second clamping portion 44 are each connected to the first wall 41 via the connection wall 45. Optionally, the first wall 41 of the first adaptor 40 is bonded to the first backplane 20 to reduce the use of fasteners such as screws.

In some embodiments, the first clamping portion 43 and the second clamping portion 44 may be arranged oppositely or staggered. In some specific examples, as shown in FIG. 4, the first clamping portion 43 and the second clamping portion 44 are arranged in a staggered manner. Specifically, an orthographic projection of the first clamping portion 43 on the first backplane 20 does not overlap with an orthographic projection of the second clamping portion 44 on the first backplane 20. Optionally, the protrusion 111 is a bar-shaped structure extending along a first direction, which is also the extending direction of the sidewalls 11a. For example, the first direction is the direction perpendicular to the paper in FIG. 4.

Optionally, as shown in FIGS. 4 and 5, the first clamping portion 43 includes: a first upright plate 431 and a first inclined plate 432, one end of the first upright plate 431 is connected to the first wall 41 via the connection wall 45, the other end of the first upright plate 431 is connected to one end of the first inclined plate 432, and the first inclined plate 432 is inclined to the first upright plate 431; and from one end of the first inclined plate 432 close to the first upright plate 431 to the other end away from the first upright portion 431, the first inclined plate 432 gradually gets away from the first backplane 20. The second clamping portion 44 includes: a second upright plate 441 and a second inclined plate 442, one end of the second upright plate 441 is connected to the first wall 41 via the connection wall 45, the other end of the second upright plate 441 is connected to one end of the second inclined plate 442, and the second inclined plate 442 is inclined to the second upright plate 441; and from one end of the second inclined plate 442 close to the second upright plate 441 to the other end away from the second upright portion 441, the second inclined plate 442 gradually gets closer to from the first backplane 20. The first upright plate 431 and the second upright plate 441 are configured to clamp the protrusion 111. When the bezel assembly is assembled, the first adaptor 40 may be fixed on the first backplane 20 and then used to clamp the protrusion 111, so that through the arrangement of the first inclined plate 432 and the second inclined plate 442, the protrusion 111 may extend between the first upright plate and the second upright plate 441 easily.

The first backplane 20 may be connected to the first sidewall 11a of the bezel 10 via a plurality of first adaptors 40. It should be noted that, in different first adaptors 40, the number of the first clamping portions 43 may be the same or different, and the number of the second clamping portions 44 may be the same or different. For example, one part of the first adaptors 40 may be as shown in FIG. 7, in which one first clamping portion 43 and two second clamping portions 44 are provided; and the other part of the first adaptors 40 may be as shown in FIG. 6, in which one first clamping portion 43 and one second clamping portion 44 are provided.

Figure 8:
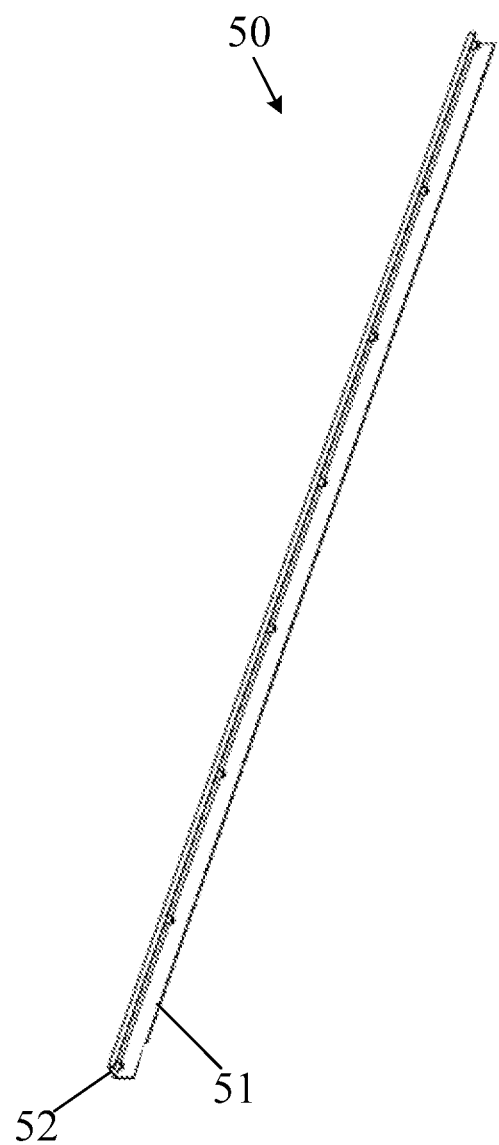
FIG. 8 is a perspective view of a second adaptor provided in some embodiments of the present disclosure.

As shown in FIG. 2, in some embodiments, the display device further includes a second adaptor 50. FIG. 8 is a perspective view of a second adaptor provided in some embodiments of the present disclosure. As shown in FIGS. 2 and 8, the second adaptor 50 includes: a first fixing portion 51 and a second fixing portion 51 connected to the first fixing portion 52. The first fixing portion 51 is connected to the first backplane 20, and the second fixing portion 52 is connected to the second sidewall 11b. For example, the first fixing portion 51 and the second fixing portion 52 form an integral structure. The first fixing portion 51 is a strip structure parallel to the second sidewall 11b and attached to the second sidewall 11b, and the second fixing portion 52 is a strip structure parallel to the first backplane 20 and attached to the first backplane 20. It should be noted that the shape of the second adaptor 50 in FIG. 8 is merely exemplary. For example, a notch may be further provided on the second fixing portion 52 to avoid other elements on the second sidewall 11b.

Optionally, shown in FIGS. 2 and 8, the first fixing portion 51 is bonded to the first backplane 20, and the second fixing portion 52 is connected to the second sidewall 11b via a fastener such as a screw. In this manner, no structure such as a screw is provided on the first backplane 20, which improves the rear view appearance of the display device, as well as surface smoothness of the first backplane 20.

In addition, the second sidewall 11b may be provided with a protrusion 112, and the second adaptor 50 is in contact with the protrusion 112. For example, the second adaptor 50 may be connected to the protrusion 112 by an adhesive or screw.

As shown in FIGS. 1 and 2, the bezel 10 further includes a shield portion 12 connected to each of the sidewalls 11 in one-to-one correspondence. The shield portion 12 forms an integral structure with the corresponding sidewall 11. The main display module DM1 is located between the shield portion 12 and the first backplane 20, and the shield portion 12 is configured to shield an edge region of the main display module DM1.

As shown in FIGS. 1 and 2, the bezel assembly further includes: a second backplane 31 located between the main display module DM1 and the first backplane 20; and a middle frame 32. For example, the middle frame 32 includes: a middle frame sidewall 321 and a spacing portion 322 connected to the middle frame sidewall 321. The middle frame sidewall 321 surrounds the main display module DM1, and the spacing portion 322 has one end connected to the middle frame sidewall 321 and the other end extending toward a middle part of the main display module DM1. The spacing portion 322 forms an integral structure with the middle frame sidewall 321. The spacing portion 322 is located between the main display module DM1 and the second backplane 31, and is connected to the second backplane 31. For example, the spacing portion 322 may be connected to the second backplane 31 via a fastener such as a screw, or may be bonded to the second backplane 31 by an adhesive material.

In this display device, the first backplane 20 is connected to the bezel 10 via the first adaptor 40 and the second adaptor 50, the main display module DM1, the middle frame 32 and the second backplane 31 are limited in the accommodation space, and the shield portion 12 is arranged opposite to the first backplane 20 and remains relatively fixed, so that the positions of the main display module DM1, the middle frame 32 and the second backplane 31 are defined in a thickness direction of the main display module DM1.

As shown in FIG. 1, the electronic apparatus further includes: a speaker assembly 60, a base 80 located on a side of the bezel 10 away from the main display module, and a detachable connector 70 disposed on the base 80. The bezel assembly is connected to the detachable connector 70, and the speaker assembly 60 is located between the base 80 and the display device and connected to the detachable connector 70.

For example, as shown in FIGS. 1 and 2, a side of the second backplane 31 facing the first backplane 20 is provided with a mounting pipe 33 fixed on the second backplane 31. For example, the mounting pipe 33 is fixed on the second backplane 20 via a fastener such as a screw. The detachable connector 70 is connected to the mounting pipe 33.

In addition to the mounting pipe 33, a structure such as a circuit board electrically connected to the main display module DM1 may be further provided in a gap between the first backplane 20 and the second backplane 31.

Figure 9:
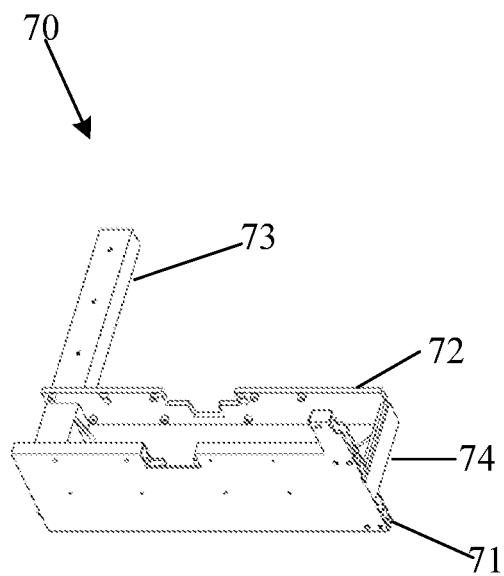
FIG. 9 is a perspective view of a detachable connector provided in some embodiments of the present disclosure.

FIG. 9 is a perspective view of a detachable connector provided in some embodiments of the present disclosure. As shown in FIG. 9, the detachable connector 70 includes a mounting rod 73, a first mounting platform 71 and a second mounting platform 72. The first mounting platform 71 is disposed on the base 80, and the second mounting platform 72 is connected to the mounting rod 73. An auxiliary support rod 74 is further provided between the second mounting platform 72 and the first mounting platform 71, and the auxiliary support rod 74 and the mounting rod 73 are disposed on two ends of the first mounting platform 71, respectively. The first mounting platform 71 and the second mounting platform 72 are connected to two ends of the auxiliary support rod 74, respectively, so as to ensure stable arrangement of the first mounting platform 71 and the second mounting platform 72. One end of the mounting rod 73 is connected to the first mounting platform 71, while the other end is configured to extend into and be fixed within the mounting pipe 33. Thereby, the mounting rod is provided upright on the first mounting platform to extend into and be fixed within the mounting pipe. A notch is provided on the bezel 10 at a position corresponding to the mounting rod 73 to facilitate extension of the mounting rod 73 into the mounting pipe 33.

Figure 10:
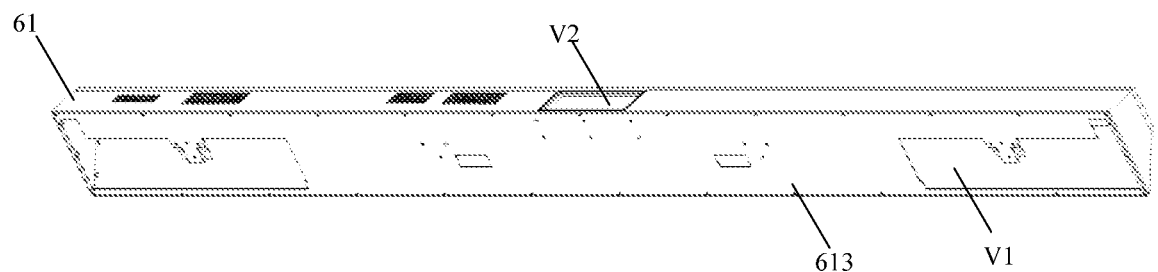
FIG. 10 is a perspective view of a speaker assembly provided in some embodiments of the present disclosure.
Figure 11:
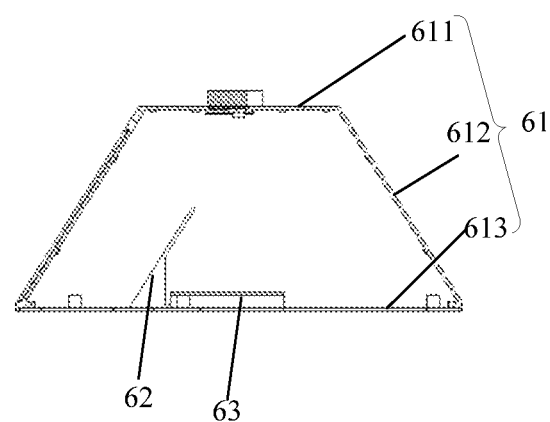
FIG. 11 is a schematic view of a longitudinal section of a speaker assembly provided in some embodiments of the present disclosure.
Figure 12:
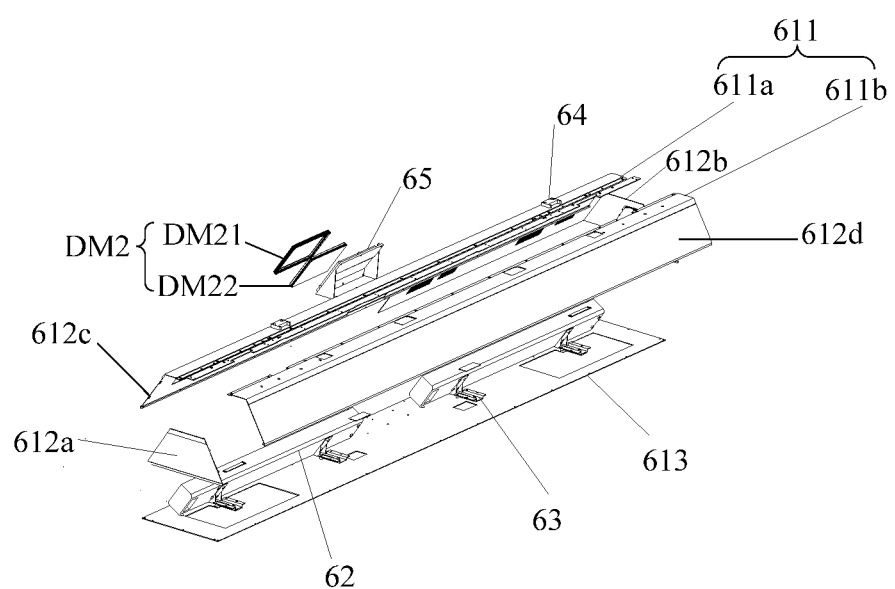
FIG. 12 is an exploded view of a speaker assembly provided in some embodiments of the present disclosure.

FIG. 10 is a perspective view of a speaker assembly provided in some embodiments of the present disclosure. FIG. 11 is a schematic view of a longitudinal section of a speaker assembly provided in some embodiments of the present disclosure. FIG. 12 is an exploded view of a speaker assembly provided in some embodiments of the present disclosure. As shown in FIGS. 10 to 12, the speaker assembly 60 includes a speaker housing 61, a circuit board arranged in the speaker housing 61, a speaker fixator 63, a speaker 62 fixed on the speaker fixator 63, and other structures. The speaker housing 61 may have an overall long strip shape, and a length direction thereof is the direction perpendicular to the paper in FIG. 3. The speaker housing 61 includes a top wall 611, a bottom wall 613 opposite to the top wall 611, and a plurality of sidewalls 612 connected between the top wall 611 and the bottom wall 613. The top wall 611 of the speaker housing 61 includes a left top wall 611a and a right top wall 611b. The plurality of sidewalls 612 of the speaker housing 61 are: a front wall 612a, a rear wall 612b, a left sidewall 612c, and a right sidewall 612d. The left sidewall 612c and the left top wall 611a are integrally connected, the right sidewall 612d and the right top wall 611b are integrally connected, and the front wall 612a, the rear wall 612b, the left sidewall 612c, and the right sidewall 612d can each be connected to the bottom wall 613 via connectors. A structural member (not shown) may be further provided on the front sidewall 612a, with at least a part of the structural member located on a surface of the front sidewall 612c facing away from rear sidewall 612b. According to the requirements, ornaments such as cloth may be provided on a cloth structural member.

Figure 13:
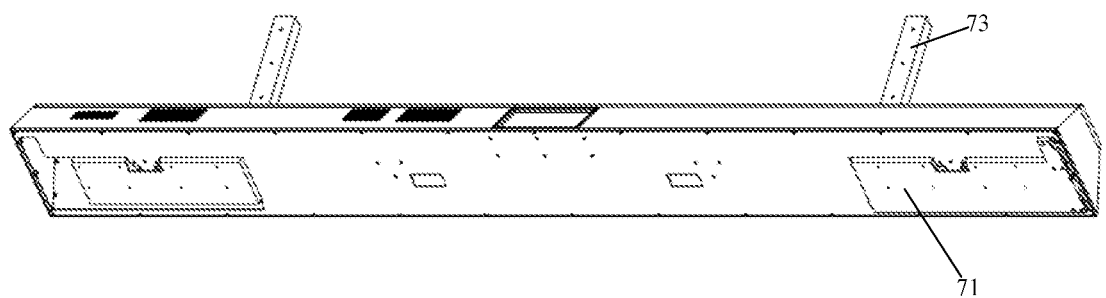
FIG. 13 is a perspective view of a speaker assembly in connection with a detachable connector provided in some embodiments of the present disclosure.

FIG. 13 is a perspective view of a speaker assembly in connection with a detachable connector provided in some embodiments of the present disclosure. As shown in FIGS. 10 to 13, through holes V1 are provided in the bottom wall 613 and the top wall 611 of the speaker housing 61, and the mounting rod 73 of the detachable connector 70 passes through the through holes V1 on the bottom wall 613 and the top wall 611 of the speaker housing 61 to extend into the mounting pipe 33. The second mounting platform 72 is located in the speaker housing 61 and abuts against the top wall 611 of the speaker housing 61. For example, the second mounting platform 72 is connected to the top wall 611 of the speaker housing 61 via a fastener such as a screw. A stopper 64 may be further disposed on the top wall 611 of the speaker housing 61 to limit the position of the mounting rod 73.

It should be noted that the through hole V1 in the bottom wall 613 of the speaker housing 61 allows at least the mounting rod 73 and the second mounting platform 72 of the detachable connector 70 to pass through, while the through hole in the top wall 611 of the speaker housing 61 allows the mounting rod 73 of the detachable connector 70 to pass through.

Optionally, the speaker housing 61 has a height less than a distance between the first mounting platform 71 and the second mounting platform 72. In this manner, as shown in FIG. 13, when the second mounting platform 72 is connected to the top wall 611 of the speaker housing 61, the first mounting platform 71 protrudes outward from the bottom wall 613 of the speaker housing 61, so there is a non-zero spacing between the speaker housing 61 and the base 80.

In some embodiments, a hollowed-out portion V2 is provided in the sidewall of the speaker housing 61, and the placement portion 65 is disposed in the speaker housing 61 and opposite to the hollowed-out portion V2, so that an auxiliary display module DM2 is exposed from the hollowed-out portion V2.

Figure 14:
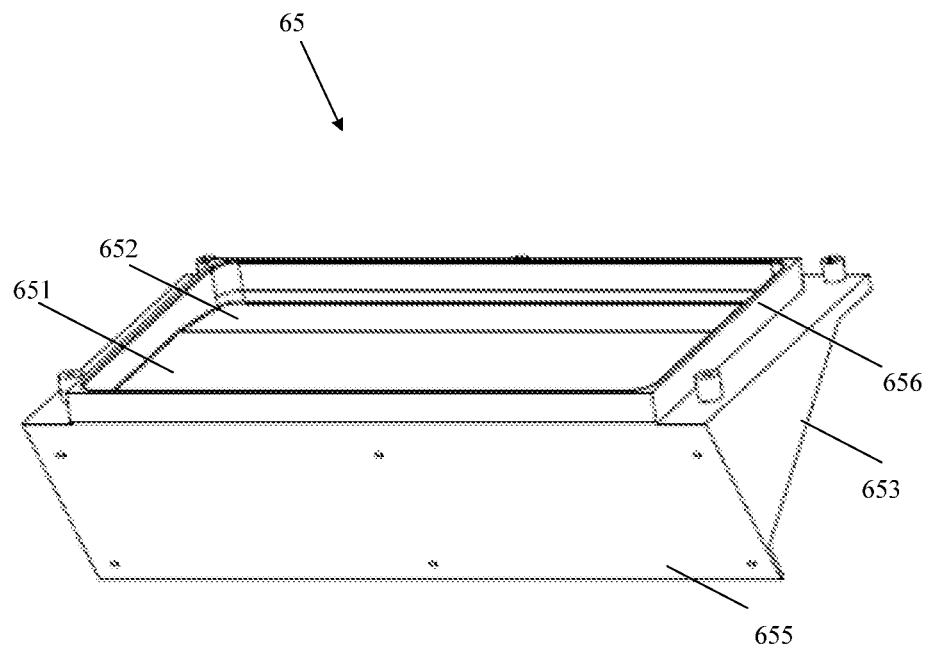
FIGS. 14 and 15 are perspective views from two angles of a placement portion provided in some embodiments of the present disclosure, respectively.
Figure 15:
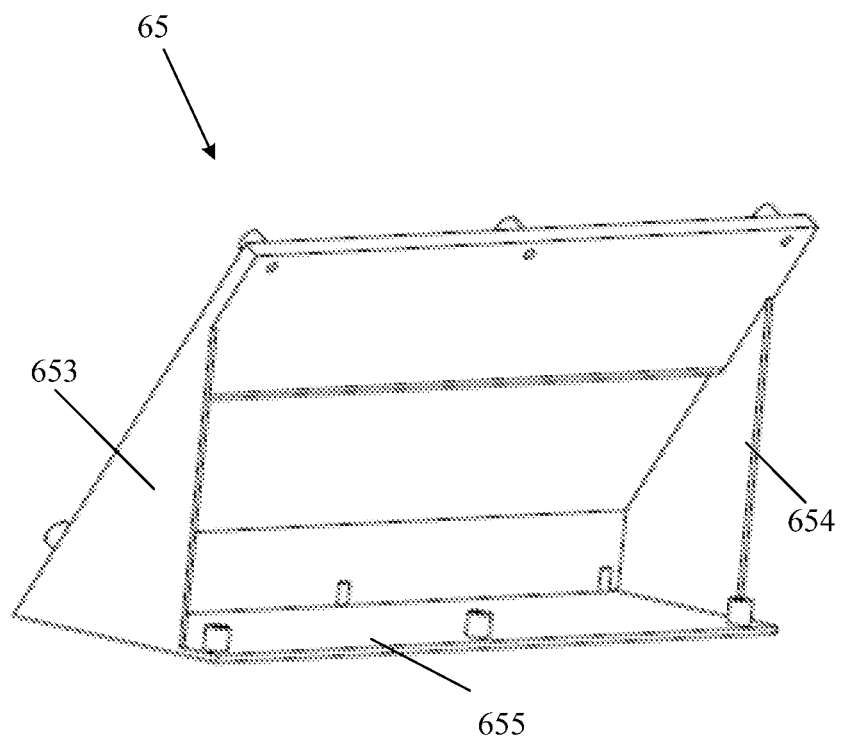
Figure 16:
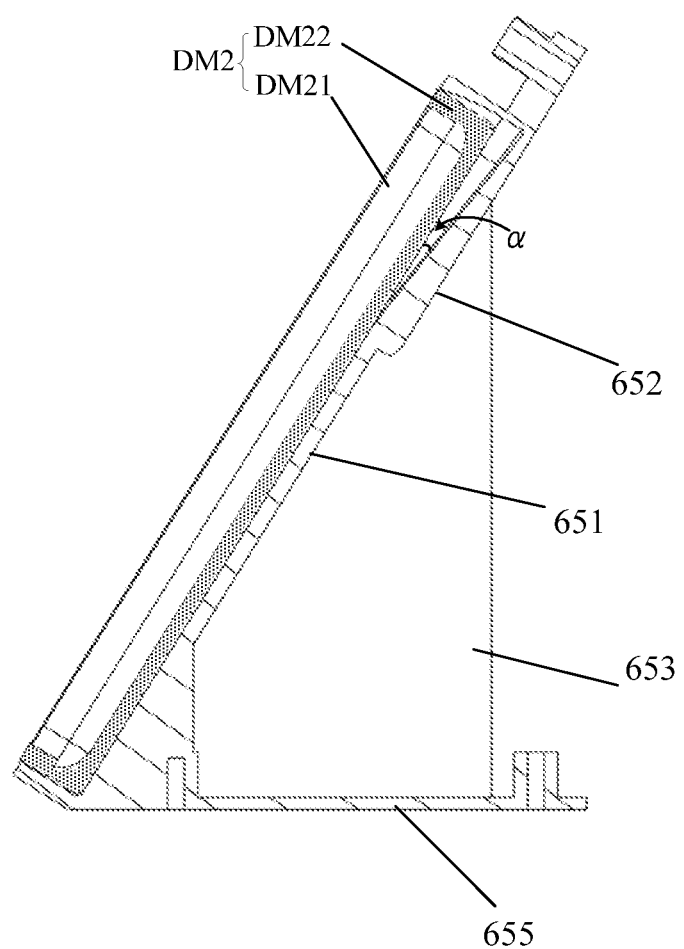
FIG. 16 is a longitudinal sectional view of an auxiliary display module supported on the placement portion provided in some embodiments of the present disclosure.

FIGS. 14 and 15 are perspective views from two angles of the placement portion 65 provided in some embodiments of the present disclosure, respectively. FIG. 16 is a longitudinal sectional view of an auxiliary display module supported on the placement portion provided in some embodiments of the present disclosure. As shown in FIGS. 14 to 16, the placement portion 65 includes: a first support portion 651 and a second support portion 652 arranged in sequence along a direction away from the bottom wall 613 of the speaker housing, the first support portion 651 has a first support surface, the second support portion 652 has a second support surface, and the first support surface and the second support surface are both inclined to the bottom wall 613 of the speaker housing 61. The first support surface and the second support surface may meet. As shown in FIG. 16, an angle between a plane where the first support surface is located and the bottom wall 613 of the speaker housing 61 is greater than an angle between a plane where the second support surface is located and the bottom wall 613 of the speaker housing 61. One part of the auxiliary display module DM2 is supported on the first support surface, while the other part forms a non-zero angle α (e.g., 2° to 20°) with the second support surface, i.e., a non-zero spacing is provided between a top end of the auxiliary display module DM2 and the second support surface.

Optionally, the first support portion 651 is magnetic, and the auxiliary display module DM2 is attached to the first support portion 651. For example, the auxiliary display module DM2 may include: an auxiliary screen housing DM22 and an auxiliary display screen DM21 fixed on the auxiliary screen housing DM22. The auxiliary screen housing DM22 is supported on the first support portion 651, and the auxiliary screen housing DM22 is a magnetic housing. The auxiliary screen housing DM22 is fixed to the first support portion 651 through the magnetic attraction between the first support portion 651 and the auxiliary screen housing DM22.

Optionally, the auxiliary display module DM2 has a touch function. For example, the auxiliary display screen DM21 includes a touch structure configured to detect occurrence of touch.

As shown in FIG. 14, the placement portion 65 further includes: a first side plate 653 and a second side plate 654 disposed opposite to each other, a bottom plate 655 and a protective wall 656. The first support portion 651 and the second support portion 652 are each disposed between the first side plate 653 and the second side plate 654, and a bottom end of the first side plate 653, a bottom end of the second side plate 654 and a bottom end of the first support portion 651 are each connected to the bottom plate 655. The bottom plate 655 is fixed to the bottom wall 613 of the speaker housing 61. The protective wall 656 is configured to surround the auxiliary display module DM2 on the placement portion 65.

In an embodiment of the disclosure, when the auxiliary display module DM2 is supported on the first support surface, a non-zero spacing is provided between the top end of the auxiliary display module DM2 and the second support surface. At this time, the bottom end of the auxiliary display module DM2 will be tilted by pressing the top end, so that the auxiliary display module DM2 is separated from the first support surface and the auxiliary display module DM2 can be removed easily.

Figure 17:
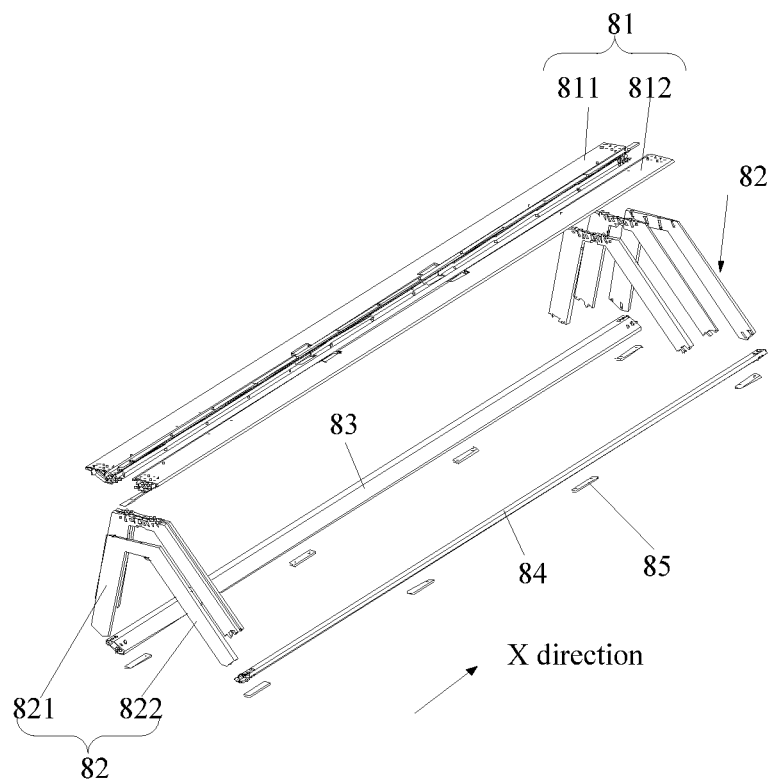
FIG. 17 is an exploded view of a base provided in embodiments of the present disclosure.

FIG. 17 is an exploded view of a base provided in embodiments of the present disclosure. As shown in FIG. 17, the base 80 includes: a top plate 81 and multiple pairs of supports 82. Optionally, the top plate 81 is formed by splicing a first plate portion 811 and a second plate portion 812. The two supports 82 of the same pair are connected to opposite ends of the top plate 81, respectively, and each include a first support strip 821 and a second support strip 822. Top ends of the first support strip 821 and the second support strip 822 are both connected to the top plate 81, and extending directions of the first support strip 821 and the second support strip 822 are crossed with each other, i.e., the supports generally form a V shape. When the base 80 is placed on the ground, the first and second support strips 821, 822 may form a triangular support with the ground, thereby improving the supporting stability of the base 80.

For example, the base 80 includes six (i.e., three pairs of) supports 82, and each end of the top plate 81 is provided three of the supports 82 which are arranged in sequence along an extending direction of the top plate 81 (the X direction in FIG. 17). Two adjacent supports 82 at the same end of the top plate 81 are attached to each other. The top plate 81 of the base 80 may be formed by two portions spliced together, and each support 82 is connected to both portions of the top plate 81.

As shown in FIG. 17, the base 80 further includes a first connector 83 and a second connector 84, bottom ends of the two first support strips 821 of the same pair of supports 82 are connected to two ends of the first connector 83, respectively, and bottom ends of the two second support strips 822 of the same pair of supports 82 are connected to two ends of the second connector 84, respectively, thereby further improving stability of the base 80.

A plurality of protective pads 85 may be disposed on bottom surfaces of the first connector 83 and the second connector 84, which pads can prevent the base 80 from being worn and may have an anti-slip function. For example, the protective pad 85 is a silicone pad.

The display device provided in the embodiment of the present disclosure can be assembled conveniently. For example, in the assembly process, various portions of the base 80 may be assembled together, various portions of the speaker assembly 60, the auxiliary display module DM2, and the placement portion 65 may be assembled together, and the main display module DM1, the bezel 10, the middle frame 32, and the second backplane 31 may be assembled together first; then the detachable connector 70 is fixed on the base 80 and assembled with the speaker assembly 60, and the upright portion 73 of the detachable connector 70 is connected to the mounting pipe 33 on the second backplane 31; and then, the first backplane 20 is connected to the first sidewall 11a of the bezel 10 via the first adaptor 40, and connected to the second sidewall 11b of the bezel 10 via the second adaptor 50.

It should be noted that although the above embodiments have been described taking the example in which the placement portion 65 is disposed in the speaker housing 611, the present disclosure is not limited thereto, and for example, the placement portion 65 may be provided on the base 80.

It will be appreciated that the above implementations are merely exemplary implementations for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. An electronic apparatus, comprising: a display device, a base, a detachable connector, an auxiliary display module, and a placement portion for placing the auxiliary display module,
   the display device being disposed on the base through the detachable connector,
   wherein the display device comprises:
   a main display module;
   a bezel assembly disposed on the base through the detachable connector and comprising a bezel assembly and a first backplane, the bezel comprising a plurality of sidewalls surrounding the main display module and connected to the first backplane, and an accommodation space defined by the bezel and the first backplane, in which the main display module is located; wherein a surface of at least one of the sidewalls facing the main display module is provided with a protrusion; and
   a first adaptor comprising: a first wall, a second wall, a first clamping portion and a second clamping portion, wherein each of the second wall, the first clamping portion and the second clamping portion is connected to the first wall, the first wall is connected to the first backplane, the second wall is disposed opposite to the sidewalls, and the first clamping portion and the second clamping portion are configured to clamp the protrusion.

2. The electronic apparatus according to claim 1, wherein the first clamping portion is located on a side of the protrusion away from the first backplane, and the second clamping portion is located on a side of the protrusion close to the first backplane;
   the first clamping portion comprises: a first upright plate and a first inclined plate, two ends of the first upright plate are respectively connected to the first wall and the first inclined plate, and the first inclined plate is inclined to the first upright plate; and from one end of the first inclined plate close to the first upright plate to the other end away from the first upright plate, the first inclined plate gradually gets away from the first backplane;
   the second clamping portion comprises: a second upright plate and a second inclined plate, two ends of the second upright plate are respectively connected to the first wall and the second inclined plate, and the second inclined plate is inclined to the second upright plate; and from one end of the second inclined plate close to the second upright plate to the other end away from the second upright plate, the second inclined plate gradually gets closer to the first backplane; and
   the first upright plate and the second upright plate are configured to clamp the protrusion.

3. The electronic apparatus according to claim 2, wherein an orthographic projection of the first clamping portion on the first backplane does not overlap with an orthographic projection of the second clamping portion on the first backplane.

4. The electronic apparatus according to claim 1, wherein the first wall is bonded to the first backplane.

5. The electronic apparatus according to claim 1, wherein the bezel assembly further comprises: a second backplane located between the main display module and the first backplane;
- a side of the second backplane facing the first backplane is provided with a mounting pipe fixed on the second backplane; and
- the detachable connector comprises a mounting rod and a first mounting platform, the first mounting platform is fixed on the base, and the mounting rod is vertically arranged on the first mounting platform and configured to extend into and be fixed within the mounting pipe.

6. The electronic apparatus according to claim 5, wherein the electronic apparatus further comprises a speaker assembly located between the base and the display device, and connected to the detachable connector.

7. The electronic apparatus according to claim 6, wherein the speaker assembly comprises a speaker housing having through holes in both a bottom wall and a top wall thereof to allow the mounting rod to pass therethrough.

8. The electronic apparatus according to claim 7, wherein the detachable connector further comprises a second mounting platform abutting a top wall of the speaker housing, and the speaker housing has a height less than a distance between the first mounting platform and the second mounting platform so that there is a non-zero spacing between the speaker housing and the base.

9. The electronic apparatus according to claim 6, wherein a hollowed-out portion is provided on the speaker housing, and the placement portion is disposed in the speaker housing and opposite to the hollowed-out portion, so that the auxiliary display module is exposed from the hollowed-out portion.

10. The electronic apparatus according to claim 9, wherein the placement portion comprises: a first support portion and a second support portion arranged in sequence along a direction away from the bottom wall of the speaker housing, the first support portion has a first support surface, the second support portion has a second support surface, and the first support surface and the second support surface are both inclined to the bottom wall of the speaker housing, and
- an angle between a plane where the first support surface is located and the bottom wall of the speaker housing is greater than an angle between a plane where the second support surface is located and the bottom wall of the speaker housing, so that one part of the auxiliary display module is supported on the first support surface, while the other part forms a non-zero angle with the second support surface.

11. The electronic apparatus according to claim 10, wherein the first support portion is magnetic, and the auxiliary display module is attached to the first support portion.

12. The electronic apparatus according to claim 1, wherein the placement portion is disposed on the base.

13. The electronic apparatus according to claim 1, wherein the auxiliary display module comprises a touch structure configured to detect occurrence of touch.

14. The electronic apparatus according to claim 1, wherein the base comprises a top plate and multiple pairs of supports, the two supports of the same pair being connected to opposite ends of the top plate, respectively;
- wherein each support comprises a first support strip and a second support strip, top ends of the first support strip and the second support strip are both connected to the top plate, and extending directions of the first support strip and the second support strip are crossed with each other.

15. The electronic apparatus according to claim 14, wherein the base further comprises a first connector and a second connector, bottom ends of the two first support strips of the same pair of supports are connected to two ends of the first connector, respectively, and bottom ends of the two second support strips of the same pair of supports are connected to two ends of the second connector, respectively.

16. The electronic apparatus according to claim 1, wherein the plurality of sidewalls of the bezel comprise: a first sidewall and a plurality of second sidewalls, the first sidewall is disposed between the main display module and the base and provided with the protrusion, and the first clamping portion and the second clamping portion of the first adaptor is configured to clamp the protrusion on the first sidewall; and
- the display device further comprises a second adaptor comprising: a first fixing portion and a second fixing portion connected to the first fixing portion, the first fixing portion being connected to the first backplane, and the second fixing portion being connected to the second sidewall.

17. The electronic apparatus according to claim 16, wherein the first fixing portion is bonded to the first backplane.

18. The electronic apparatus according to claim 1, wherein the bezel further comprises a shield portion connected to each of the sidewalls in one-to-one correspondence, the main display module is located between the shield portion and the first backplane, and the shield portion is configured to shield an edge region of the main display module.

* * * * *